M. L. STEGMAIER.
CREDIT ACCOUNT FILE CABINET.
APPLICATION FILED SEPT. 30, 1908.
924,700.
Patented June 15, 1909.
3 SHEETS—SHEET 1.
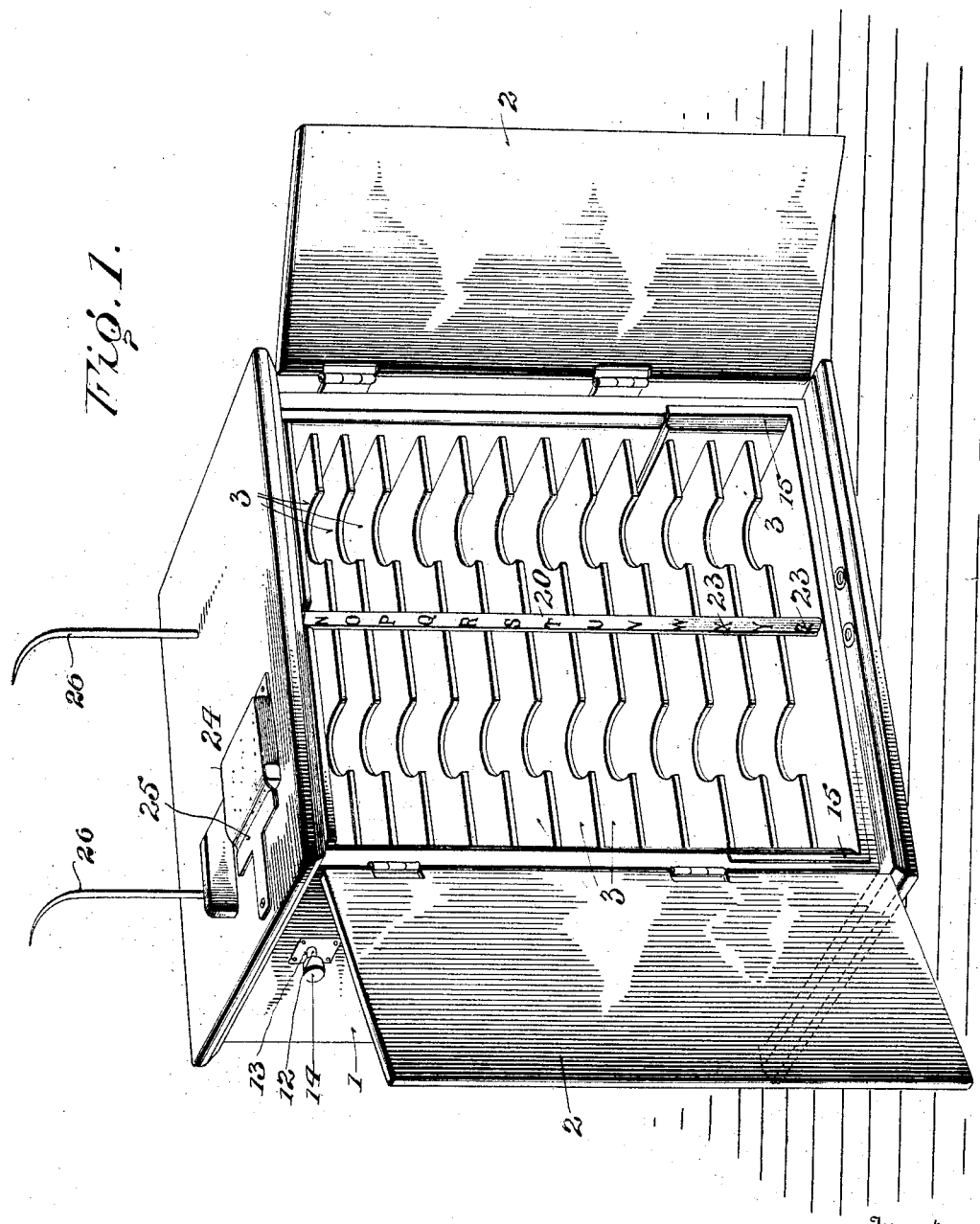
Witnesses
Inventor
Michael L. Stegmaier
By
Attorneys M. L. STEGMAIER.
CREDIT ACCOUNT FILE CABINET.
APPLICATION FILED SEPT. 30, 1908.
924,700.
Patented June 15, 1909.
3 SHEETS—SHEET 2.
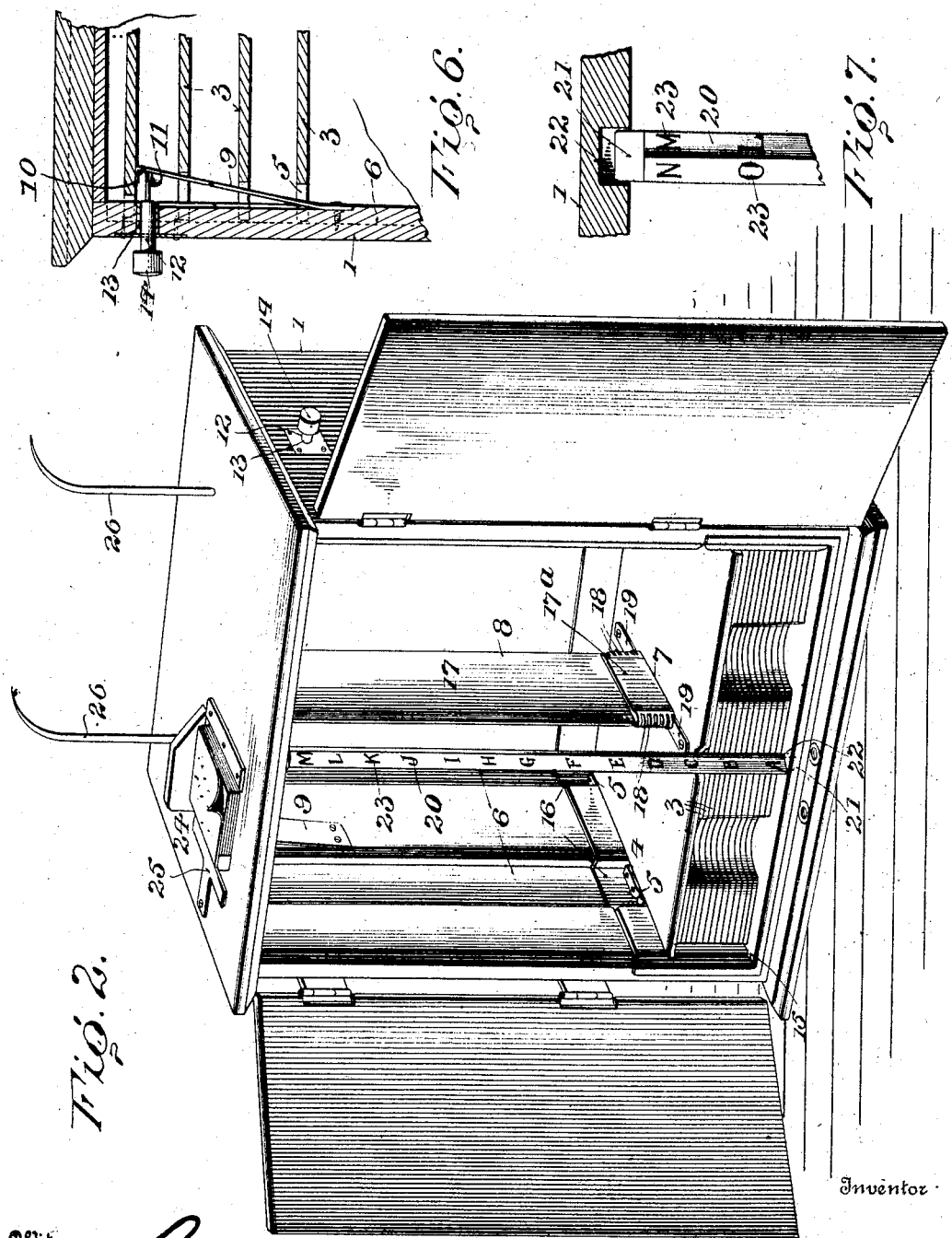
Witnesses
Inventor
Michael L. Stegmaier
By
Attorneys M. L. STEGMAIER.
CREDIT ACCOUNT FILE CABINET.
APPLICATION FILED SEPT. 30, 1908.
924,700.
Patented June 15, 1909.
3 SHEETS—SHEET 3.
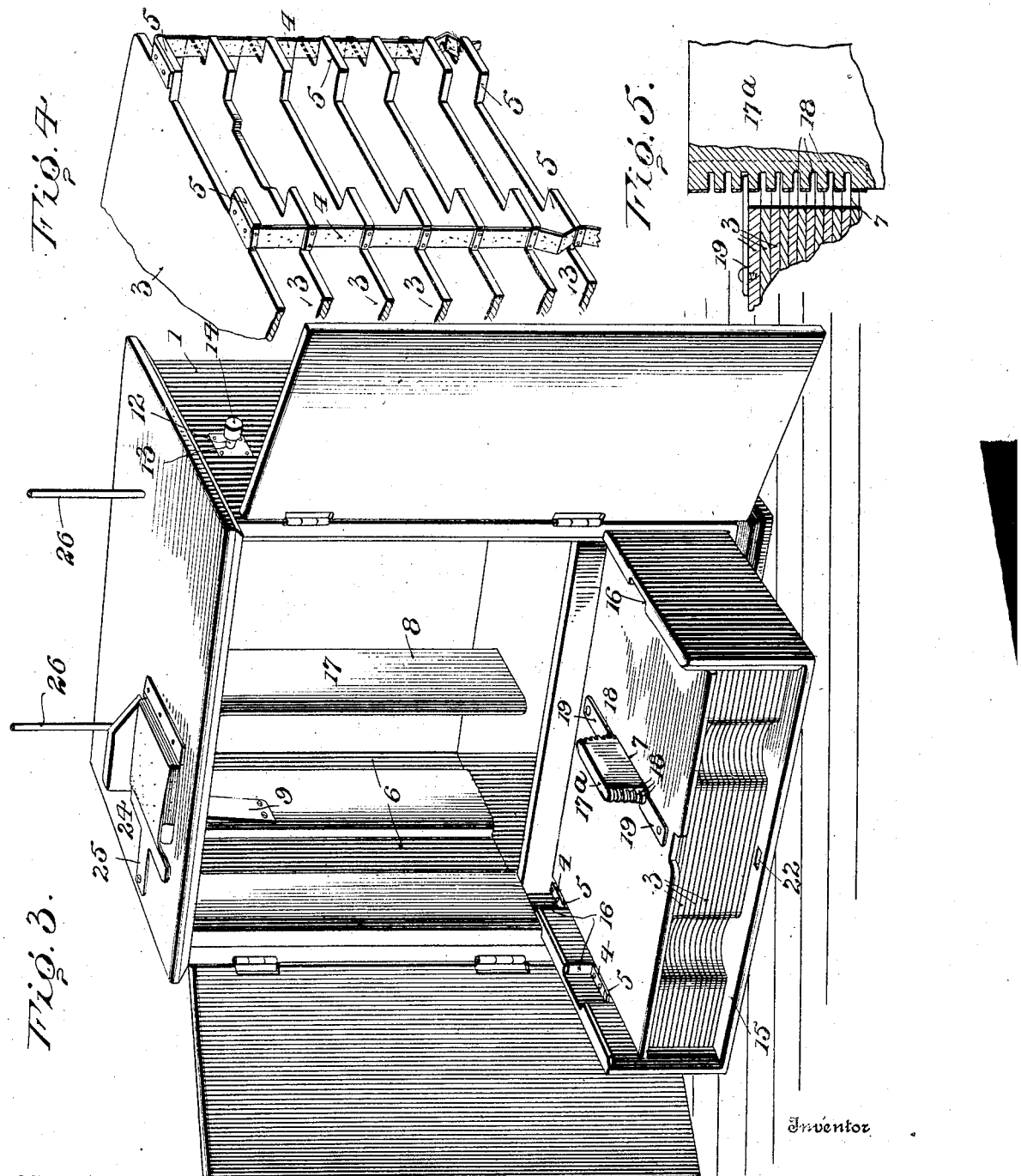
Witnesses
Inventor
Michael L. Stegmaier
By
Attorneys

UNITED STATES PATENT OFFICE.

MICHAEL L. STEGMAIER, OF CUMBERLAND, MARYLAND.

CREDIT-ACCOUNT FILE-CABINET.

No. 924,700.  Specification of Letters Patent.  Patented June 15, 1909.

Application filed September 30, 1908. Serial No. 455,532.

*To all whom it may concern:*

Be it known that I, MICHAEL L. STEGMAIER, a citizen of the United States, residing at Cumberland, in the county of Allegany and State of Maryland, have invented a new and useful Credit-Account File-Cabinet, of which the following is a specification.

This invention comprehends certain new and useful improvements in filing cabinets of that type provided with a series of indexed compartments, into the requisite ones of which, the papers or the like are placed so as to be susceptible of ready access when desired for use.
The primary object of my invention is a filing cabinet in which the shelves forming the series of filing compartments may be collapsed with the papers therebetween, to constitute a compact structure that may be conveniently removed from the case or cabinet so as to be stowed away in a safe, thus precluding the liability of damage to the accounts therein over night, or at other times when the accounts are not desired for use.
And the invention also has for its object an improved filing cabinet, particularly adapted for use in stores maintaining a credit system and which is arranged to contain the accounts of the various credit customers in such a manner that any desired account may be expeditiously located and removed so as to have the item entered thereon at the time of the sale, thereby insuring all of the accounts being posted to date and eliminating the use of the obviously objectionable pass books.

With these and other objects in view that will fully appear as the description proceeds, the invention consists in certain constructions and arrangements of the parts that I shall hereinafter fully describe, and then point out the novel features thereof in the appended claims.

For a full understanding of the invention and the merits thereof, and to acquire a knowledge of the details of construction, reference is to be had to the following description and accompanying drawings, in which:
Figure 1 is a perspective view of a filing cabinet constructed in accordance with the invention; Fig. 2 is a similar view showing the shelves collapsed into the drawer; Fig. 3 is a similar view with the drawer partially withdrawn; Fig. 4 is a fragmentary perspective view illustrating the flexible connection between the shelves; Fig. 5 is a detail sectional view showing the engagement of one of the latches with the keeper plate; Fig. 6 is a similar view of the catch; and, Fig. 7 is a detail view showing the manner of removably mounting the index strip in the top of the case.

Corresponding and like parts are referred to in the following description and indicated in all the views of the drawings by the same reference characters.

My improved filing cabinet consists essentially of a case 1 which may be of any desired or approved construction or design, except as hereinafter noted, and which is provided preferably at its front with hinged double doors 2 by means of which the interior of the case is rendered readily acessible. Mounted within the case 1 are a plurality of shelves 3 which are arranged horizontally and are substantially co-extensive with the interior dimensions of the top and bottom of the case and which are designed to be flexibly connected together in any suitable manner. In the present instance, these shelves are connected at their side edges by two or more leather or other similar flexible bonds 4 that are secured at longitudinally spaced points to corresponding laterally disposed lugs 5 which are provided on the respective shelves and work in vertically disposed guide channels 6 formed in the opposite side walls of the case. The shelves 3 are also formed with preferably elongated registering central apertures 7 through the instrumentality of which the various shelves are slidingly mounted upon a central guide bar 8 that is disposed vertically between the top and bottom of the case.

The shelves 3 are designed to be moved upwardly in the case, as is permitted by their sliding connection therewith, so as to be spaced apart vertically, as best seen in Fig. 1, to constitute a plurality of compartments in which the papers to be filed are contained. In order to maintain the shelves in operative or extended position, I provide catches 9 which are secured to the opposite sides of the case near the upper ends thereof, and which in the present instance are in the form of flat springs that are secured at their lower ends to the said sides and that have their upper ends normally disposed inwardly in spaced relation thereto. The upper ends 10 of the catches are arranged to be pressed outwardly against the side walls of the case by and upon the upward movement of the uppermost shelf 3, but as soon as said shelf has passed upwardly beyond the extremities 10, the latter spring inwardly to assume their normal positions, so that the uppermost shelf rests thereupon and is held against any reverse movement, thereby retaining the series of shelves extended. The upper extremities 10 of the spring catches are preferably formed with outwardly disposed ears 11 to which plungers 12 are connected at their inner ends, said plungers passing loosely outwardly in openings 13 formed in the sides of the case and terminating beyond such sides in suitable heads 14. With this construction, it is possible for the operator to slide the plungers oppositely and outwardly and thus move the angularly disposed extremities 10 of the swinging catches outwardly against the sides of the case so as to remove the means of support for the uppermost shelf 3, whereupon the shelves move downwardly to assume collapsed positions, as illustrated in Fig. 2.

When the shelves are in the knocked-down position just described, they are entirely received in a drawer or like receptacle 15 that is removably placed in the lower portion of the case 1 and that is preferably constructed without a front so as not to interfere with access to the lowermost compartments when the shelves are extended. The sides of the drawer 15 are formed in opposite faces with channels 16 in which the lugs 5 of the shelves enter in the collapsed position of the shelves whereby the shelves are held in the drawer.

The channels 6 in the case are continuous to the channels 16 of the drawer and receive the tongues or lugs 5 of the shelves when the shelves are extended.

The central guide bar 8 is constructed in two sections 17 and 17ª, the uppermost section 17 being rigid with and depending from the top of the case 1, while the lowermost section 17ª projects upwardly from the bottom of the drawer 15, the said sections being separated substantially in the plane of the upper edges of the drawer and being arranged for vertical alinement when the drawer is in its normal position in the case. The lowermost section 17ª is preferably equipped at its front and rear edges with toothed keeper plates 18, and the uppermost shelf carries pivoted latches 19 designed to be engaged with corresponding teeth of the keeper plates to hold the shelves in collapsed position and admit of the drawer being handled when withdrawn from the case, without the liability of the shelves becoming accidentally extended.

It is of course understood that the lowermost section 17ª of the central guide bar 8 assists in preventing the shelves from falling out of the drawer by a movement toward the front of the drawer, and that the latches 19 also constitute part of the means for preventing, in connection with the section 17ª venting, the shelves from dropping out of the drawer, while the latches 19 and section 17ª by themselves prevent the extending of the shelves while in the drawer, irrespective of the lugs 5 and the grooves or channels 16. The shelves are retained in the case in extended condition not only by the lugs 5 on the shelves and their position in the channels 6, but also by means of the central guide bar 8, the lower section of which is carried by the drawer, and removable therewith.

As before stated, the drawer 15 is normally held in the case 1, and as the preferred means for attaining this object, I employ a vertically disposed indexing strip 20 that is arranged substantially in the plane of the guide bar 8 and that is provided at its opposite ends with tongues 21 which are arranged to be fitted into mortises 22 formed in the top of the case and the bottom of the drawer, respectively. The tongue at the upper extremity of the indexing strip is of such a length as to admit of sufficient upward movement of the latter to disengage the opposite tongue from the mortise in the drawer, and the indexing strip is then moved downwardly to withdraw the upper tongue from the top of the case, whereupon the indexing strip is entirely removed from position and hence releases the drawer 15 and admits of the same being removed from the case 1.

It is to be particularly observed that when the shelves are extended, the central guide bar 8 constitutes a partition and forms two vertically arranged series of compartments, and the indexing strip 20 displays two columns of reference characters 23, the characters of the said columns being adapted for registry with the compartments of the respective series just mentioned so as to designate said compartments, as by the letters of the alphabet, in order that the account of any customer may be found in the compartment whose reference character corresponds with the initial letter of the customer's surname.

In the preferred construction of my improved cabinet, I provide upon the top of the case 1 a suitable holder 24 for a pad of sales slips, and arrange in proximity to the said holder, a spring clip 25 adapted to sustain a sheet of carbon paper over the uppermost slip of the pad. The top of the case 1 is also provided with impaling pins 26.

Before describing the manner of using a cabinet embodying the improvements of my invention, it is to be assumed that the shelves 3 are extended in operative position, with the compartments of the respective series arranged in proximity to the reference characters 23, and the accounts of the customers contained in the requisite compartments. In the event of a sale to a customer maintaining a credit account, the storekeeper opens one of the doors 2, and after glancing along the column of reference characters 23, withdraws from the requisite compartment the account of the customer in question. This account is then placed over or upon the sheet of carbonized paper, and the various items of the particular sale are entered upon the account, the account being then returned to its place in the filing cabinet and the uppermost slip of the pad which bears the carbon copy of the entry upon the account, being detached and handed to the customer. With such a system, it will be evident that the various items of each sale are entered upon the customer's account at the time of purchase, and hence the various credit accounts will be always posted to date, thereby effecting a material economy in the time and labor usually required for this purpose. Inasmuch as these accounts are original records of the customer's indebtedness to the storekeeper, it would be unwise to permit the accounts to remain in the cabinet over night or at other times when the cabinet system is not in use, since the accounts would thus be needlessly exposed to the liability of loss, misplacement or damage by fire or the like. However, with my improved filing cabinet, such a course would not be required, as when the storekeeper closes his business for the day, it is only necessary to draw the plungers 12 outwardly to operate the spring catches 9 and release the uppermost shelf 3, so that all of the shelves will fall downwardly or become collapsed with the accounts interposed therebetween. The uppermost shelf 3 is then pressed downwardly to compress the papers between the shelves, and the latches 19 are engaged with the two keeper plates 18 to hold the parts against becoming accidentally extended. The indexing strip 20 is removed as before described so as to release the drawer 15, and the latter, together with the collapsed shelves contained therein, is withdrawn from the case 1 and is placed in a safe or the like in order to secure the protection of the accounts. At the resumption of business the drawer is again inserted in the case 1, the latches 19 are disengaged from the lower section 17$^a$ of the guide bar 8 and the shelves may then be easily extended and then held in extended condition by means of the spring catches 9.

From the foregoing description, in connection with the accompanying drawings, it will be apparent that I have provided an improved filing cabinet in which the shelves forming the filing compartments are mounted in a removable drawer and may be extended into an operative position in the case of the cabinet or collapsed into the drawer, according as desired; in which the various shelves are flexibly connected to permit such movement, and are suitably guided in the case to relieve the connecting means of excessive strain; which embodies the characteristics of simplicity, durability and lightness; and which consists of comparatively few parts that may be easily and cheaply manufactured and readily assembled.

It is to be understood that the word "drawer" in the appended claims is not to be construed as limited to a sliding receptacle, and that various changes in the construction and arrangement of this and other parts of the device may be made without departing from the scope of the invention as defined by the claims.

Having thus described the invention, what I claim is:

1. A filing cabinet, comprising a case, a set of collapsible and extensible shelves, a drawer arranged to contain said shelves in the collapsed condition thereof and adapted to be moved into and out of the case, means for locking the shelves in the drawer against accidental displacement thereof, the shelves being arranged to be extended within the case, and means for holding the shelves extended.

2. A filing cabinet, comprising a case, a set of collapsible and extensible shelves, a drawer arranged to contain said shelves in the collapsed condition thereof and adapted to move into and out of the case, means for holding the shelves in collapsed condition in the drawer, the shelves being arranged to be extended within the case, and means for holding the shelves extended.

3. A filing cabinet, comprising a case, a set of collapsible and extensible shelves, a drawer arranged to contain said shelves in the collapsed condition thereof and adapted to move into and out of the case with the shelves in collapsed condition, the drawer being formed with channels and the shelves with lugs sliding in said channels, the case being formed with channels that are continuations of the channels in the drawer whereby to permit the extending of the shelves in the case, and means for holding said shelves extended.

4. A filing cabinet, comprising a case, a set of collapsible and extensible shelves, a drawer arranged to contain said shelves in the collapsed condition thereof, and adapted to be moved into and out of the case, a guide bar mounted within the case and drawer and dividing the shelves into a plurality of series of compartments, the shelves being formed with apertures by which they are fitted to slide on said bar in the extending and collapsing movements of the shelves in the case, and means for holding said shelves extended.

5. A filing cabinet, comprising a case, a set of collapsible and extensible shelves, a drawer arranged to contain said shelves in the collapsed condition thereof, and adapted to be moved into and out of the case with the shelves in collapsed condition, a sectional guide bar mounted in the case, one section of said guide bar being secured to the case and the other section to the drawer, the shelves being formed with apertures by which they are mounted to slide over said sections in their extending and collapsing movements, and means for holding said shelves extended.

6. A filing cabinet, comprising a case, a set of collapsible and extensible shelves, a drawer arranged to contain said shelves in the collapsed condition thereof, and adapted to be moved into and out of the case with the shelves in collapsed condition, a guide bar mounted in the case, and formed with keepers, the shelves being formed with apertures by which they are mounted to slide on said guide bar, and a latch secured to an end shelf of the set, and designed to engage said keepers whereby to lock the shelves in the drawer, as against the extension movement.

7. A filing cabinet, comprising a case, a set of collapsible and extensible shelves, a drawer arranged to contain said shelves in the collapsed condition thereof and adapted to move into and out of the case with the shelves in collapsed condition, the shelves being arranged to be extended in the case, means for holding the shelves extended, and means for retaining the shelves in the case in extended condition.

8. A filing cabinet, comprising a case, a set of collapsible and extensible shelves, a drawer arranged to contain said shelves in the collapsed condition thereof and adapted to move into and out of the case with the shelves in collapsed condition, the shelves being arranged to be extended in the case, means for holding the shelves extended, and means for retaining the shelves in the case in extended condition, said last named means becoming inoperative upon the releasing of the holding means and the collapsing of the shelves.

9. A filing cabinet, comprising a case, a set of collapsible and extensible shelves, a drawer arranged to contain said shelves in the collapsed condition of the same, and adapted to be moved into and out of the case with the shelves in collapsed condition, the shelves being arranged to be extended in the case, means for holding the shelves extended, and an indexing strip arranged to hold the drawer in the case.

10. A filing cabinet, comprising a case, a set of collapsible and extensible shelves, a drawer arranged to contain the shelves in the collapsed condition thereof and adapted to be moved into and out of the case with the shelves in such collapsed condition, the shelves being arranged to be extended within the case at right angles to the direction of movement of the drawer, and means for retaining the set of shelves within the case in their extended condition.

MICHAEL L. STEGMAIER.

Witnesses:
 WM. L. MCCRAY,
 GEORGE M. MCCUNE.